United States Patent
Yamazaki et al.

(10) Patent No.: US 7,344,073 B2
(45) Date of Patent: Mar. 18, 2008

(54) MAGNETIC RECORDING MEDIUM

(75) Inventors: Yoshikazu Yamazaki, Kounosu (JP); Kazunari Kawai, Yachiyo (JP); Daisuke Yano, Kasukabe (JP); Tesshu Miyahara, Ageo (JP)

(73) Assignee: Dainippon Ink and Chemicals, Inc., Tokyo (JP)

( * ) Notice: Subject to any disclaimer, the term of this patent is extended or adjusted under 35 U.S.C. 154(b) by 0 days.

(21) Appl. No.: 10/472,185

(22) PCT Filed: Mar. 29, 2002

(86) PCT No.: PCT/JP02/03200

§ 371 (c)(1),
(2), (4) Date: Sep. 26, 2003

(87) PCT Pub. No.: WO02/080151

PCT Pub. Date: Oct. 10, 2002

(65) Prior Publication Data

US 2004/0089726 A1    May 13, 2004

(30) Foreign Application Priority Data

Mar. 30, 2001    (JP)    ............... 2001-099771

(51) Int. Cl.
*G06K 7/08*    (2006.01)
(52) U.S. Cl. .................................................. 235/449
(58) Field of Classification Search ................ 235/449, 235/375, 379, 380, 486, 487, 492
See application file for complete search history.

(56) References Cited

U.S. PATENT DOCUMENTS

| | | | |
|---|---|---|---|
| 3,946,206 A * | 3/1976 | Darjany ................. | 360/2 |
| 4,315,145 A | 2/1982 | Nishikawa et al. | |
| 4,849,618 A * | 7/1989 | Namikawa et al. ......... | 235/493 |
| 5,113,062 A * | 5/1992 | Fujita et al. ................ | 235/493 |
| 5,421,618 A * | 6/1995 | Okazaki et al. ............... | 283/82 |
| 5,439,755 A * | 8/1995 | Fujita et al. .......... | 428/694 BP |

(Continued)

FOREIGN PATENT DOCUMENTS

EP    0 071 850 A1    2/1983

(Continued)

OTHER PUBLICATIONS

Supplemental European Search Report mailed Dec. 29, 2005.

*Primary Examiner*—Ahshik Kim
(74) *Attorney, Agent, or Firm*—Edwards Angell Palmer & Dodge LLP

(57) ABSTRACT

The present invention discloses a magnetic recording medium comprised by sequentially layering a magnetic recording layer, intermediate layer and concealment layer on a non-magnetic substrate made from a thermoplastic resin, wherein the surface of the intermediate layer forms a single smooth surface with the surface of the non-magnetic substrate as a result of embedding the magnetic recording layer and the intermediate layer within a portion of the non-magnetic substrate, and the concealment layer conceals the surface of the intermediate layer and the surface of the non-magnetic substrate. This magnetic recording medium has superior concealment and adhesion of the concealment layer for the magnetic recording layer as well as a high level of design properties regardless of the type of magnetic particles used in the magnetic recording layer.

5 Claims, 1 Drawing Sheet

U.S. PATENT DOCUMENTS

| | | | | |
|---|---|---|---|---|
| 5,463,212 | A | * | 10/1995 | Oshima et al. ............. 235/468 |
| 5,597,998 | A | * | 1/1997 | Ohno et al. .................. 235/487 |
| 5,679,440 | A | * | 10/1997 | Kubota .................... 428/195.1 |
| 6,164,548 | A | * | 12/2000 | Curiel ........................ 235/487 |
| 6,186,398 | B1 | * | 2/2001 | Kato et al. .................. 235/449 |

FOREIGN PATENT DOCUMENTS

| | | |
|---|---|---|
| JP | 58-80783 | 5/1983 |
| JP | 58-164017 | 9/1983 |
| JP | 61-145727 | 7/1986 |
| JP | 61-248228 | 11/1986 |
| JP | 64-25318 | 1/1989 |
| JP | 2-278517 | 11/1990 |
| JP | 6-231451 | 8/1994 |
| JP | 7-65356 | 3/1995 |
| JP | 7-117382 | 5/1995 |
| JP | 7-121864 | 5/1995 |
| JP | 7-210853 | 8/1995 |
| JP | 9-254573 | 9/1997 |

* cited by examiner

US 7,344,073 B2

MAGNETIC RECORDING MEDIUM

BACKGROUND OF THE INVENTION

1. Field of the Invention

The present invention relates to a magnetic recording medium having a concealment layer that conceals the color of the magnetic recording layer, and more particularly, to a card-like magnetic recording medium such as a credit card or bank cashing card. Moreover, the present invention also relates to a transferable magnetic recording medium used during the production of this type of magnetic recording medium by a transfer process.

The present application is based on Japanese Unexamined Patent Application, First Publication No. 2002-293067, and the contents of that application are incorporated in this specification.

2. Description of Related Art

Since magnetic recording media comprising the formation of a magnetic recording layer on a non-magnetic substratum have a brown or black magnetic recording layer attributable to the color of the magnetic particles in the magnetic recording layer, the region of this magnetic recording layer restricts the design of the recording medium and hinders the achieving of a high level of design properties. As a technique for imparting design properties to such magnetic recording media, a concealment layer is first layered on the magnetic recording layer so as to cover it in order to conceal the color of the magnetic recording layer with another color. Alternatively, a new pattern may be arranged on said concealment layer.

In order to satisfactorily conceal the magnetic recording layer, the concealment layer must completely conceal the color of the magnetic recording layer and must have satisfactory adhesion to the magnetic recording layer. In general, the concealment layer must also similarly have satisfactory adhesion to the portion of the non-magnetic substrate where the magnetic recording layer is not formed in addition to adhesion to the magnetic recording layer. Consequently, studies have been conducted so as to satisfy these conditions relating to concealment and adhesion of the concealment layer to the magnetic recording layer mainly by selecting a suitable blending design and binder resin for the magnetic recording layer or performing various types of treatment on the magnetic recording layer.

For example, the surface of the magnetic recording layer is normally laminated prior to forming the concealment layer, which together with enhancing the adhesive strength of the magnetic recording layer itself to the non-magnetic substrate, smoothens the surface of the magnetic recording layer to improve concealment of the magnetic recording layer by the concealment layer. When a magnetic recording layer is formed on a portion of the non-magnetic substrate in particular, a difference in level forms between the magnetic recording layer and the non-magnetic substrate, and since concealment of the magnetic recording layer by the concealment layer is impaired, the magnetic recording layer is embedded within the non-magnetic substrate followed by laminating of the surface of the magnetic recording layer so that the same level surface is formed between the surface of the magnetic recording layer and the surface of the non-magnetic substrate. The magnetic recording layer is required to have satisfactory processability in terms of heat resistance and so forth in order to realize satisfactory concealment in this manner.

However, designing the formulation of the magnetic recording layer requires that foremost considerations be given to the dispersion of magnetic particles involved in the output characteristics of the magnetic recording layer, and when a design is attempted to be implemented that simultaneously satisfies the aforementioned concealment, adhesion and heat resistance, this has been accompanied by difficulties depending on the magnetic particles used.

Recently, due to the growing demand for imparting more advanced design properties to magnetic cards, for example, multiple layers of concealment layers, pattern layers and so forth are layered onto the magnetic recording layer, resulting in the need to use magnetic particles having high output and high resolution to compensate for decreases in read-back output and resolution caused by increases in the total thickness of these non-magnetic layers.

Moreover, magnetic cards require the use of magnetic particles that satisfy the conditions of higher weather-resistant storage properties, environmental stability, and recorded information storage stability over a long period of time, and magnetoplumbite-type ferrite magnetic particles such as barium ferrite particles are frequently used for magnetic recording layers having high resistance to magnetic force (high coercivity), weather-resistant storage properties, high output and high resolution in order to accommodate these requirements.

However, the aforementioned magnetoplumbite-type ferrite magnetic particles have a larger particle size than conventional magnetic particles for magnetic recording layers, and since they are tabular, they stack easily during orientation treatment. Consequently, surface becomes rough, thereby decreasing the concealment by the concealment layer. In addition, the binder resin and magnetic particles of the magnetic recording layer are easily unevenly distributed resulting in inferior heat resistance. Moreover, holes easily form in the magnetic recording layer resulting in decreased film strength, and since coating solution for the concealment layer layered on the magnetic recording layer penetrates into the holes, concealment by the concealment layer decreases further.

In order to solve the problems accompanying this type of surface form and internal structure of the magnetic recording layer, Japanese Unexamined Patent Application, First Publication No. Hei 7-65356 enhances the strength, heat resistance, wear resistance and processability of a magnetic recording layer by providing a protective layer that covers it to reinforce the surface of the magnetic recording layer.

Therefore, a constitution was examined in which a concealment layer is layered onto an intermediate layer by using the aforementioned protective layer as an intermediate layer in order to retain its advantages.

The heat resistance during laminating is definitely improved by using a hard resin having a high $T_g$ (glass transition point) for the intermediate layer that covers the magnetic recording layer. In addition, the concealment by the concealment layer is improved by smoothing the surface of the magnetic recording layer as a result of the intermediate layer covering any uneven surface. Moreover, the film strength as sequential layers is increased by layering sequentially an intermediate layer free of large holes onto the magnetic recording layer. Moreover, since holes in the magnetic recording layer are filled by the intermediate layer, concealment is improved without the concealment layer paint penetrating into the lower layer.

However, since a binder resin having a high $T_g$ (glass transition point) is used for the intermediate layer based on the need to retain heat resistance, a difference occurs in thermal characteristics and dynamic characteristics between the card base and the intermediate layer, resulting in the formation of cracks at their boundary. As a result, coating solution for the concealment layer enters these cracks causing a decrease in concealment. In addition, since the dynamic characteristics of the coated layer vary considerably between the intermediate layer and concealment layer, adhesion between the two layers becomes poor.

On the other hand, although Japanese Unexamined Patent Application, First Publication No. Hei 7-25185 describes a method for ensuring adhesion between the magnetic recording layer and concealment layer by providing a thermal adhesive layer comprised of a vinyl acetate-vinyl chloride copolymer having a low $T_g$ (glass transition point) between the magnetic recording layer and concealment layer, in this constitution, there is the possibility of the occurrence of sticking during laminating of the magnetic recording layer prior to forming the concealment layer. In addition, since the difference in level between the magnetic recording layer and non-magnetic substrate cannot be eliminated unless laminating is performed, concealment by the concealment layer decreases.

In this manner, magnetic recording media of the prior art had sometimes poor heat resistance or other poor processability depending on the magnetic particles used for the magnetic recording layer, and the concealment and adhesion of the concealment layer to the magnetic recording layer was sometimes impaired.

SUMMARY OF THE INVENTION

A first object of the present invention is to provide a magnetic recording medium having a concealment layer on a magnetic recording layer that conceals the magnetic recording layer, wherein the concealment layer exhibits superior concealment of the magnetic recording layer and the magnetic recording medium has a high level of design properties regardless of the magnetic particles used in the magnetic recording layer.

Moreover, a second object of the present invention is to provide a magnetic recording medium having a concealment layer on a magnetic recording layer that conceals the magnetic recording layer, wherein the concealment layer has superior adhesion regardless of the magnetic particles used in the magnetic recording layer.

A third object of the present invention is to provide a transferable type of magnetic recording medium for producing a magnetic recording medium having the aforementioned characteristics.

In addition, a fourth object of the present invention is to provide a magnetic recording medium in card-shaped magnetic recording medium having a concealment layer on a magnetic recording layer that conceals the magnetic recording layer, wherein the concealment layer has superior concealment and adhesion and the magnetic recording medium has high output, high resolution and superior long-term storage stability.

Namely, the present invention provides a magnetic recording medium comprised by sequentially layering a magnetic recording layer, an intermediate layer and a concealment layer on a non-magnetic substrate comprised of a thermoplastic resin; wherein the magnetic recording layer and the intermediate layer are embedded within a portion of the non-magnetic substrate, the surface of the intermediate layer forms a single smooth surface with the surface of the non-magnetic substrate, the intermediate layer contains non-magnetic inorganic fine particles, and the concealment layer conceals the surface of the non-magnetic substrate and the surface of the intermediate layer.

Moreover, the present invention also provides a transferable magnetic recording medium comprised by sequentially layering an intermediate layer, magnetic recording layer and thermal adhesive layer on a transferable substrate film; wherein the intermediate layer contains non-magnetic inorganic fine particles.

The magnetic recording medium of the present invention comprises the formation of an intermediate layer on a magnetic recording layer, and in the step prior to forming a concealment layer, the intermediate layer is the uppermost layer and undergoes laminating to be embedded in the non-magnetic substrate. The intermediate layer contains non-magnetic inorganic fine particles, and the effect of improving heat resistance afforded by these fine particles is remarkable. As a result, the magnetic recording layer and intermediate layer can be embedded in a portion of the non-magnetic substrate without the occurrence of sticking, and the surface of the intermediate layer forms a single smooth surface with the surface of the non-magnetic substrate. Consequently, concealment by the concealment layer formed on the intermediate layer is extremely satisfactory.

Since the effect of improving heat resistance resulting from addition of the non-magnetic inorganic fine particles is large, it is no longer necessary to use a resin having a high $T_g$ (glass transition point) for the intermediate layer as in the prior art, and its selection can be expanded to resins having a lower $T_g$ (glass transition point) that is closer to the $T_g$ (glass transition point) of the non-magnetic substrate. Consequently, since the thermal characteristics and dynamic characteristics of the intermediate layer and non-magnetic substrate become closer to each other, there is no formation of cracks in the boundary region during laminating, and paints for the concealment layer does not enter the cracks, thereby making it possible to realize a higher degree of concealment.

Here, since there are many cases in which the concealment layer covers the entire surface of the non-magnetic substrate, a binder resin having thermal and dynamic characteristics close to those of the non-magnetic substrate is normally used for the binder resin in terms of the need to ensure adhesion.

Thus, it becomes possible to select a binder resin for the intermediate layer that not only has a $T_g$ (glass transition point) and other thermal and dynamic characteristics that approximate those of the non-magnetic substrate, but also characteristics that approximate those of the binder resin of the concealment layer.

When the transferable magnetic recording medium of the present invention is used, since an intermediate layer that contains non-magnetic inorganic particles is layered between the magnetic recording layer and the transferable substrate film, it has satisfactory peelabilities with the transferable substrate film. Moreover, since an intermediate layer, for which heat resistance has been improved by containing non-magnetic inorganic fine particles, can be formed on the magnetic recording layer using a transfer process, a magnetic recording medium can be produced that has superior heat resistance during processing as well as superior concealment and adhesion of the concealment layer with respect to the magnetic recording layer.

DETAILED DESCRIPTION OF THE INVENTION

Figure 1:
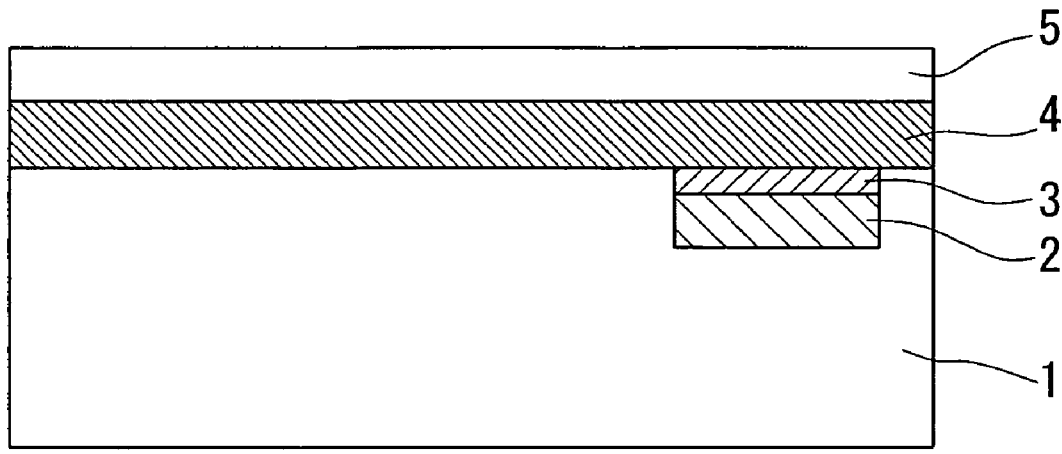
FIG. 1 is a cross-sectional view schematically showing the constitution of the magnetic recording medium of the present invention.

The basic constitution of the magnetic recording medium in the present embodiment is as shown with the cross-sectional drawing of FIG. 1. A magnetic recording layer 2 and an intermediate layer 3 are layered sequentially in that order on a portion of a non-magnetic substrate 1, both layers are embedded within said non-magnetic substrate 1, and the surface of the intermediate layer forms a single smooth surface with the surface of the non-magnetic substrate. A concealment layer 4 covers the layered portion and the non-magnetic substrate section. Furthermore, a protective layer 5 may be formed on concealment layer 4 and non-magnetic substrate 1.

Any thermoplastic resin capable of embedding the magnetic recording layer and intermediate layer by undergoing plastic deformation at a temperature range of 100 to 150° C. may be used for the non-magnetic substrate used in the present invention, examples of which include a sheet, tape or card comprised of a material such as vinyl chloride copolymer resin, polyester resin, polycarbonate resin or polypropylene resin. In addition, two or more of these may be laminated together and used as a single non-magnetic substrate.

The magnetic recording layer used in the present invention employs the constitution of magnetic recording media typically used for magnetic tape, magnetic cards and so forth, and contains as its main components, for example, binder resin and magnetic particles.

Binder resins known in the prior art that are suitable for realizing dispersion of magnetic particles and coated layer strength of the magnetic recording layer can be widely used for the binder resin in the magnetic recording layer, examples of which include vinyl chloride copolymer resin, polyurethane resin, cellulose resin and polyvinylbutyral resin.

In addition, magnetic particles known in the prior art can be used for the magnetic particles in the magnetic recording layer, examples of which include $\gamma$-$Fe_2O_3$, Cobalt-doped $\gamma$-$Fe_2O_3$, $Fe_3O_4$, Cobalt-doped $Fe_3O_4$, $CrO_2$, Barium ferrite, Strontium ferrite, Lead ferrite and Calcium ferrite particles. In particular in the magnetic recording medium used in the present invention, since the concealment layer formed on the magnetic recording layer lowers the read-back output, it is preferable to use magnetic particles that allow as high a read-back output as possible. Examples of magnetic particles that are used preferably include magnetoplumbite-type ferrite magnetic particles such as Barium ferrite, Strontium ferrite, Lead ferrite and Calcium ferrite particles.

Furthermore, the ferrite particles used preferably have a specific surface area by BET method of 3 $m^2/g$ or more, while those having a specific surface area by BET method of 4.0 $m^2/g$ or more and 10.0 $m^2/g$ and less are even more preferable. In the case the Specific surface area by BET method is lower than that indicated above, unevenness occurs in the arrangement of tabular magnetic particles, which is not desirable since it results in increased erasure noise. In addition, if the Specific surface area by BET method is 10.0 $m^2/g$ or more, dispersion and orientation of the magnetic particles become difficult.

The intermediate layer used in the present invention contains as its main components a binder resin and non-magnetic inorganic fine particles dispersed in the binder resin.

At least one type of non-magnetic inorganic fine particles selected from the group consisting of non-magnetic inorganic fine particles having a volume average particle diameter of 0.2 μm or less and needle-shaped non-magnetic inorganic fine particles having long axis length of 0.5 μm or less are preferably used for the non-magnetic inorganic fine particles contained in the intermediate layer. If the volume average particle diameter of the non-magnetic inorganic fine particles is greater than 0.2 μm, or if the long axis length of the needle-shaped non-magnetic inorganic fine particles having a long axis is greater than 0.5 μm, in the case these non-magnetic inorganic fine particles are contained in the intermediate layer, the surface of the intermediate layer is susceptible to roughening, and a difference in surface roughness occurs with the non-magnetic substrate, thereby resulting in increased likelihood of a decrease in concealment. In addition, if the particle size of the non-magnetic inorganic fine particles is excessively small, the effects of adding the non-magnetic inorganic fine particles are easily diminished, thereby decreasing the effect of improving heat resistance. Consequently, a more preferable particle size is a volume average particle diameter of 0.05 to 0.2 μm, and even more preferably from 0.005 to 0.1 μm, while in the case of needle-shaped non-magnetic inorganic fine particles having a long axis, the particle size is more preferably from 0.05 to 0.4 μm.

Examples of non-magnetic inorganic fine particles used in the intermediate layer used in the present invention include $\alpha$-alumina having an $\alpha$ conversion rate of 90% or more, $\beta$-alumina, $\gamma$-alumina, $\theta$-alumina, silicon carbide, chromium oxide, cerium oxide, $\alpha$-iron oxide, corundum, silicon nitride, titanium carbide, titanium oxide, silicon dioxide, tin oxide, magnesium oxide, tungsten oxide, zirconium oxide, boron nitride, zinc oxide, calcium carbonate, calcium sulfate, barium sulfate and molybdenum disulfide. In addition, examples of needle-shaped non-magnetic inorganic fine particles include hematite and goethite, and these are used either alone or in combination.

Among the non-magnetic inorganic fine particles, metal compound particles are preferable since they are considerably effective in further improving heat resistance when added in small amounts. Particularly preferable examples of metal compound particles include titanium dioxide, zinc oxide, iron oxide and barium sulfate; while the most preferable examples are $\alpha$-iron oxide and titanium dioxide. Non-magnetic inorganic fine particles having a moisture content of 0.1 to 5% by weight are preferable due to their satisfactory dispersion, while those having a moisture content of 0.2 to 3% by weight are more preferable, and those having a moisture content of 0.3 to 1.5% by weight are even more preferable. In addition, although non-magnetic inorganic fine particles having a specific surface area of 1 to 100 $m^2/g$ may be used, those having a specific surface area of 5 to 80 $m^2/g$ are preferable, and those having a specific surface area of 10 to 70 $m^2/g$ are more preferable.

The ratio of non-magnetic inorganic fine particles and binder resin in the present invention is preferably such that the non-magnetic inorganic fine particles account for 20 to 80% by weight, more preferably 30 to 70% by weight, and most preferably 40 to 70% by weight.

If the ratio of non-magnetic inorganic fine particles exceeds 80%, surface irregularities and cavities on the surface of the magnetic recording layer are difficult to be filled by the paints for the intermediate layer, and since the resin content is reduced, the coated layer strength of the intermediate layer decreases resulting in susceptibility to the occurrence of internal destruction. Moreover, the surface of the intermediate layer becomes rough, and since this appears in the form of a difference in the color between the section covered by the intermediate layer and the section covered by the non-magnetic substrate when the concealment layer is formed, there is increased susceptibility to decreased concealment. On the other hand, if the ratio of the non-magnetic inorganic fine particles is less than 20%, since the effect of improving heat resistance decreases, there is increased likelihood of the occurrence of sticking of the magnetic recording layer in the laminating step.

Although a wide range of resins can be used for the binder resin for the intermediate layer used in the present invention provided they are paint resins that are solid at room temperatures in order to ensure heat resistance of the intermediate layer by addition of non-magnetic inorganic fine particles, in order to improve the adhesion with adjacent layers such as the magnetic recording layer, concealment layer and non-magnetic substrate, thermoplastic resins are preferable that do not have excessively large differences in thermal characteristics and dynamic characteristics with binder resin, and examples of resins that can be used include vinyl chloride copolymer based resins, polyurethane resins, cellulose based resins, polyvinylbutyral resins, epoxy resins, phenol resins, polyester resins, acrylic resins, polymethylmethacrylate and copolymers thereof, melamine resins and styrene-maleic acid copolymer resins.

Moreover, in order to further improve the concealment properties with respect to the magnetic recording layer, it is preferable to use the same series of binder resin having compatibility with the resin used in the non-magnetic substrate for the binder resin used in the intermediate layer, and in order to improve adhesion between the intermediate layer and concealment layer, it is preferable to use the same series of binder resin having compatibility with the resin used in the concealment layer in the intermediate layer. Since the resin for the concealment layer has a comparatively wide selection range, in consideration of the fact that a vinyl chloride based resin is frequently used in the non-magnetic substrate, a vinyl chloride based resin or acrylic based resin that is compatible with it is used preferably, and a vinyl chloride based resin is used most preferably.

In consideration of the thermal and dynamic characteristics of the non-magnetic substrate and concealment layer, a binder resin having a low $T_g$ (glass transition point) of 100° C. or lower is preferably contained as the resin used in the intermediate layer. Consequently, several types of binder resins having different $T_g$ (glass transition point) values and molecular weights can be used by suitably optimizing their blending ratio while considering the minimum limit of heat resistance to be retained by the binder resin of the intermediate layer.

In addition, the resin in the intermediate layer is preferably crosslinked by a known polyisocyanate in order to improve coated layer strength.

The thickness of the intermediate layer is preferably as thin as possible provided its inherent objective is realized while not causing a decrease in the read-back output or resolution of the magnetic recording layer. In consideration of read-back output characteristics and coated layer strength, the thickness of the intermediate layer is preferably from 0.05 to 2 μm and more preferably from 0.2 to 1 μm. An intermediate layer that is thinner than the aforementioned range can be produced by enhancing the coated layer strength of the intermediate layer by using a larger amount of filled non-magnetic inorganic fine particles.

The concealment layer used in the present invention covers all or a portion of both the surface of the intermediate layer sequentially layered onto the non-magnetic substrate and the surface of the non-magnetic substrate where the intermediate layer is not present. A pattern layer that covers a portion of the concealment layer provided for the purpose of imparting design properties by forming a pattern may be present oil the concealment layer.

The concealment layer and pattern layer respectively contain as their main components binder resin and pigment dispersed in said binder resin.

Although various pigments may be used in the concealment layer and pattern layer, examples of which include inorganic pigments such as alumina, titanium oxide, chromium oxide, iron oxide, zinc oxide and scale-like metal particles, as well as organic pigments such as azo based pigment, phthalocyanine based pigment, quinacridone based pigment, perylene based pigment, anthraquinone based pigment, thioindigo pigment and indanthrene pigment, there are no particular restrictions on these pigments. In addition, concealment effects may be enhanced by additionally layering a concealment layer containing a different pigment.

In addition, known paint resins can be widely used for the binder resin, and for example, the same resins as those used for the magnetic recording layer and intermediate layer can be used.

A protective layer having a known constitution can be formed on the aforementioned concealment layer and pattern layer to improve heat resistance during laminating or to improve durability.

Figure 2:
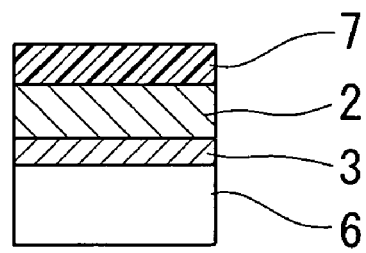
FIG. 2 is a cross-sectional view schematically showing the constitution of a transferable magnetic recording medium of the present invention.

The basic constitution of the transferable magnetic recording medium of the present invention is as shown in FIG. 2, wherein an intermediate layer 3 and a magnetic recording layer 2 are sequentially layered on a transferable substrate film 6, followed by the layering of a heat-sensitive adhesive layer 7.

Although examples of transferable substrate films that are used include polyester resins such as polyethylene terephthalate resins and polyethylene-2,6-naphthalate resins, polyolefin resins such as polypropylene resins, cellulose derivatives such as cellulose triacetate and cellulose diacetate, polyamide resins and polycarbonate resins, polyethylene terephthalate is preferable since it has both tensile strength and heat resistance.

Although there are no particular restrictions on the thickness of the transferable substrate film, it is normally from 3 to 200 μm, and preferably from 5 to 50 μm.

The constitution of the intermediate layer and magnetic recording layer of the transferable magnetic recording medium of the present invention are similar to the previously described intermediate layer and magnetic recording layer of the magnetic recording medium of the present invention, respectively. Non-magnetic inorganic fine particles are present at the interface between the intermediate layer and transferable substrate film, and the peelabilities of the transferable substrate film are satisfactory. With respect to peelabilities, the containing of needle-shaped non-magnetic inorganic fine particles having a long axis in the intermediate layer is preferable since effects tend to be manifested with a lower added amount in comparison with the case of containing ordinary non-magnetic inorganic fine particles.

The thermal adhesive layer is composed of a known resin that exhibits thermal adhesion. A material that does not have stickiness at a temperature of about 60° C. or lower but melts and has binding capacity at a temperature of about 90° C. or higher is preferably used as such a resin. Specific examples of such a material include copolymers of vinyl chloride and vinyl acetate, vinyl chloride resins such as copolymers to which have been added vinyl alcohol, maleic anhydride or acrylic acid, polyester resins, acrylic resins, polyimide resins and polyurethane resins.

The following provides a description of the production method of the magnetic recording medium or transferable magnetic recording medium of the present invention.

In producing the magnetic recording medium of the present invention, a layered portion is first produced in which a magnetic recording layer and intermediate layer are sequentially formed on a portion of a non-magnetic substrate by a coating method or transfer process. Although the magnetic recording layer and intermediate layer may be formed by sequentially coating paints for a magnetic recording layer and paints for an intermediate layer, respectively, the layered portion is preferably produced by a transfer process using a transferable magnetic recording medium based on simplicity and low costs.

The transferable magnetic recording medium of the present invention can be used for producing the aforementioned layered portion using a transfer process. In producing the layered portion using the transferable magnetic recording medium of the present invention, the surface of a heat-sensitive adhesive layer of the transferable magnetic recording medium is contacted with the surface of a non-magnetic substrate, and these layers are pressurized and heated so as to heat the adhesive layer to be 90° C. or higher from the side of the transferable substrate film of the transferable magnetic recording medium to adhere the transferable magnetic recording medium to the non-magnetic substrate. Subsequently, the transferable substrate film of the transferable magnetic recording medium is peeled from the interface with the intermediate layer, and the heat-sensitive adhesive layer, magnetic recording layer and intermediate layer are transferred to the non-magnetic substrate to produce the aforementioned layered portion.

The layered portion of the magnetic recording layer and intermediate layer formed by coating or transfer in this manner is then laminated from above the intermediate layer using a mirrored plate for 5 to 30 minutes at a temperature of 140 to 150° C. and pressure of 15 to 35 kg/cm, to embed the magnetic recording layer and intermediate layer within a portion of the non-magnetic substrate and form a single smooth surface between the surface of the intermediate layer and the surface of the non-magnetic substrate.

Moreover, although a concealment layer is formed by coating method or transfer process on said smooth, flat surface, a protective layer may also be layered by coating or transfer process.

In forming the concealment layer and protective layer by a transfer process, a thermal adhesive layer, concealment layer and protective layer are transferred onto an intermediate layer using a transfer layering in which a protective layer, concealment layer, and preferably, a thermal adhesive layer are sequentially layered on a transferable substrate film.

When forming a concealment layer by a transfer process, differing from formation of the concealment layer by a coating method, the solvent of the concealment layer does not attack the layer beneath it. In addition, in layering the concealment layer onto an intermediate layer according to a transfer process, since the concealment layer is layered through a thermal adhesive layer, problems of adhesion and binding property between the intermediate layer and concealment layer can be solved. However, when considering the fact that increases in thickness of non-magnetic layers on the magnetic recording layer have the disadvantage of causing a decrease in read-back output, it is preferable to not use a thermal adhesive layer even when employing a transfer process for the concealment layer, and in this case, adhesion between the intermediate layer and concealment layer becomes important.

In the production of the transferable magnetic recording medium of the present invention, an intermediate layer, magnetic recording layer and thermal adhesive layer are sequentially formed by a coating method on a transferable substrate film.

With respect to the selection and blending of non-magnetic inorganic fine particles, binder resin and other components used in the intermediate layer paint, the optimum conditions can be suitably selected from the previously described matters. In addition, with respect to the solvent, paint dispersion method and coating method used for the intermediate layer paint, known information used in the production and coating of magnetic recording layer paints can be used.

Although the following provides a more detailed explanation of the present invention using examples and comparative examples, the present invention is not limited to these examples. Furthermore, in the following explanation, the term "parts" refers to parts by weight.

In the following explanation, various types of transferable magnetic recording media were produced while varying the type and amount of non-magnetic inorganic fine particles in the intermediate layer and varying the amount of binder resin in the intermediate layer, and the magnetic recording layer and intermediate layer were sequentially layered by a transfer process onto a magnetic card base used as a non-magnetic substrate. Subsequently, the magnetic recording layer and intermediate layer were embedded within the magnetic card base by laminating and a concealment layer was then layered thereon to produce a magnetic card having a concealment layer.

The peel strength of the transferable substrate film was measured for the transferable magnetic recording media. In addition, the degree of resistance to sticking to the mirrored plate of the laminating machine in the laminating step for the magnetic recording layer and intermediate layer during production of a magnetic card was also measured. Moreover, the degree of concealment with respect to the magnetic recording medium along with adhesion between the concealment layer and intermediate layer were measured for the finished magnetic card.

EXAMPLE 1

1. Production of Transferable Magnetic Recording Medium

The following paints was prepared to form an intermediate layer, magnetic recording layer and colorant layer on a transferable substrate film.

(Intermediate layer paints NM-1)

| | |
|---|---:|
| α Iron oxide | 100 parts |
| DNS-235 | |

| -continued | |
|---|---|
| (Toda Kogyo Corp., mean long axis length: 0.23 µm) | |
| Vinyl chloride copolymer | 11.0 parts |
| Solbin TA2 | |
| (Nissin Chemical Industry Co., Ltd., $T_g$: 76° C.) | |
| Cellulose resin | 11.0 parts |
| CAP-482-0.5 | |
| (Eastman Chemical Company, cellulose acetate propionate $T_g$: 142° C.) | |
| Polyisocyanate | 8.8 parts |
| Hardener No. 50 (active ingredient: 50%) | |
| Sorbitan monostearate | 5 parts |
| SP-S10 (Kao Corporation) | |
| MEK | 400 parts |
| Toluene | 400 parts |
| Cyclohexanone | 200 parts |
| (Magnetic recording layer paint M1) | |
| Hexagonal ferrite magnetic particles | 100 parts |
| MC-127 | |
| (Toda Kogyo Corp., coercivity: 223 (kA/m)) | |
| Vinyl chloride based resin | 10 parts |
| MR-110 (Nippon Zeon Co. Ltd.) | |
| Polyurethane resin | 5 parts |
| T-5206 (Dainippon Ink and Chemicals Inc.) | |
| Sorbitan monostearate | 5 parts |
| SP-S10 (Kao Corporation) | |
| Polyisocyanate | 6 parts |
| Hardener No. 50 (active ingredient: 50%) | |
| MEK | 50 parts |
| Toluene | 50 parts |
| Cyclohexanone | 15 parts |
| (Heat-Sensitive Adhesive Layer Paint) | |
| Polyurethane resin | 1.5 parts |
| TS-03 (Dainippon Ink and Chemicals Inc.) | |
| Vinyl chloride-vinyl acetate copolymer resin | 3.5 parts |
| 1000LT3 (Denki Kagaku Kogyo Kabushiki kaisha) | |
| MEK | 45 parts |
| Toluene | 50 parts |

A polyethylene terephthalate film having a thickness of 24 µm was used for the transferable substrate film, and intermediate layer paint NM-1 was coated onto one side of this film to form an intermediate layer having a dry film thickness of 0.5 µm.

Magnetic recording layer paint M1 was then coated onto said intermediate layer to form a magnetic recording layer having a dry film thickness of 12 µm.

Moreover, the thermal adhesive layer paint was coated onto said magnetic recording layer to form a thermal adhesive layer having a dry film thickness of 1.5 µm and produce a transferable magnetic recording medium.

2. Production of Magnetic Card

The aforementioned transferable magnetic recording medium was laminated at a predetermined location of a vinyl chloride resin card base having a thickness of 100 µm (overlay sheet) using a heat sealing machine for 10 seconds at 120° C. and 1 kg/cm² to form a layered portion in which the magnetic recording layer and intermediate layer were layered in that order on the card base.

Two vinyl chloride resin card bases having a thickness of 280 µm (core sheet) were layered onto the card base on which the aforementioned layered portion was formed on the opposite side of the magnetic recording layer, and an additional card base of the same material having a thickness of 100 µm was layered thereon followed by laminating for 15 minutes at a temperature of 150° C. and pressure of 25 kg/cm² by tabletop press machine. By then cooling to room temperature over the course of about minutes while maintaining pressure, a single card base was obtained in the form of an aggregate of four card bases in which the layered portion of the magnetic recording layer and intermediate layer were embedded in the card base, and the surface of the intermediate layer and surface of the card base comprised a single smooth surface.

The concealment layer 1 paint described below was then coated to a thickness of 4 µm after drying using a gravure printing machine to form a concealment layer that conceals the magnetic recording layer on the card base in the form of concealment layer 1.

| (Concealment Layer 1 Paint) | |
|---|---|
| Scale-like aluminum particles | 20 parts |
| SAP210EA (Showa Aluminum Powder K.K., mean particle diameter: 12.5 µm) | |
| Vinyl chloride-vinyl acetate copolymer resin | 10 parts |
| VAGH (Union Carbide Ltd.) | |
| MEK | 35 parts |
| Toluene | 25 parts |
| Ethyl acetate | 10 parts |

Moreover, in order to produce a white background of the card design, the following concealment layer 2 paint was coated to a thickness after drying of 4 µM using a gravure printing machine to form a second concealment layer in the form of concealment layer 2.

| (Composition for Concealment Layer 2) | |
|---|---|
| Titanium oxide | 20 parts |
| Vinyl chloride-vinyl acetate copolymer resin | |
| VAGH (Union Carbide Ltd.) | 10 parts |
| MEK | 35 parts |
| Toluene | 25 parts |
| Ethyl acetate | 10 parts |

A protective layer paint described below was then coated to a thickness after drying of 2 µm by a gravure printing machine for the purpose of protecting the magnetic recording layer and concealment layers.

| (Protective Layer Paint) | |
|---|---|
| Acrylic resin | 16 parts |
| KU-273 (Dainippon Ink and Chemicals Inc.) | |
| Talc pigment | 8 parts |
| #5000 PJ (Matsumura Sangyo) | |
| Isocyanate hardener | 4.3 parts |
| D-750 (Dainippon Ink and Chemicals Inc., active ingredient: 75%) | |
| MEK | 37 parts |
| Toluene | 37 parts |

A card base in which each of the layers described above was layered was laminated for 15 minutes at a temperature of 110° C. and pressure of 25 kg/cm² using a tabletop press machine followed by cooling to room temperature over the course of about 30 minutes while maintaining pressure to enhance the smoothness of the card surface.

Subsequently, a magnetic card in which the thickness of non-magnetic layer on the magnetic recording layer that contains the intermediate layer was produced by punching out to a desired size.

EXAMPLES 2-10 AND COMPARATIVE EXAMPLE 1

Transferable magnetic recording media were produced in the same manner as Example 1 with the exception of using compositions NM-2 through NM-11 for the intermediate layer as shown in Table 1 for the compositions for the intermediate layer, followed by producing the magnetic cards of Examples 2 to 10 and Comparative Example 1 in the same manner as Example 1 in which the thickness of the non-magnetic layer on the magnetic recording layer was 10 μm.

TABLE 1

|  | Ex. 1 | Ex. 2 | Ex. 3 | Ex. 4 | Ex. 5 | Ex. 6 | Ex. 7 | Ex. 8 | Ex. 9 | Ex. 10 | Comp. Ex. 1 |
|---|---|---|---|---|---|---|---|---|---|---|---|
| Resin Composition | NM-1 | NM-2 | NM-3 | NM-4 | NM-5 | NM-6 | NM-7 | NM-8 | NM-9 | NM-10 | NM-11 |
| DNS-235 | 100 | 100 | 100 | 100 | 100 |  |  |  |  |  |  |
| TTO-51B |  |  |  |  |  | 100 | 100 | 100 | 100 | 100 |  |
| Solbin TA2 | 11 | 25 | 50 | 100 | 175 | 11 | 25 | 50 | 100 | 175 |  |
| CAP-482-0.5 | 11 | 25 | 50 | 100 | 175 | 11 | 25 | 50 | 100 | 175 |  |
| L-20 |  |  |  |  |  |  |  |  |  |  | 25 |
| Hardener No. 50 | 8.8 | 20 | 40 | 80 | 140 | 8.8 | 20 | 40 | 80 | 140 | 10 |
| SP-S10 | 5 | 5 | 5 | 5 | 5 | 5 | 5 | 5 | 5 | 5 | 5 |
| MEK | 400 | 400 | 400 | 400 | 400 | 400 | 400 | 400 | 400 | 400 | 400 |
| Toluene | 400 | 400 | 400 | 400 | 400 | 400 | 400 | 400 | 400 | 400 | 400 |
| Cyclohexanone | 200 | 200 | 200 | 200 | 200 | 200 | 200 | 200 | 200 | 200 | 200 |

DNS-235: α iron oxide, Toda Kogyo Corp., mean long axis length: 0.23 μm
TT0-51B: Titanium oxide, Ishihara Sangyo, volume average particle diameter: 0.01 to 0.03 μm
Solbin TA2: Vinyl chloride copolymer, Nissin Chemical Industry Co., Ltd., $T_g$: 76° C.
CAP-482-0.5: Cellulose acetate propionate, Eastman Chemical Company, $T_g$: 42° C.
L-20: Cellulose acetate, Daicel Chemical Industries, Ltd., $T_g$: 180° C.
Hardener No. 50: Polyisocyanate (active ingredient: 50%)
SP-S10: Sorbitan monostearate, Kao Corporation

COMPARATIVE EXAMPLE 2

A transferable magnetic recording medium was produced in the same manner as Example 1 with the exception of not coating the intermediate layer as in Example 1, followed by producing a magnetic card in the same manner as Example 1 in which the thickness of the non-magnetic layer on the magnetic recording layer was 10 μm.

COMPARATIVE EXAMPLE 3

A transferable magnetic recording medium was produced in the same manner as Example 2 with the exception of using the following magnetic recording layer paint M-2 for the magnetic recording layer paint in Example 2, followed by producing a magnetic card in the same manner as Example 1 in which the thickness of the non-magnetic layer on the magnetic recording layer was 10 μm.

| (Composition M-2 for Magnetic Recording Layer) | |
|---|---|
| Hexagonal ferrite magnetic particles MC-127 (Toda Kogyo Corp., coercivity: 223 (kA/m)) | 100 parts |
| Vinyl chloride based resin MR-110 (Nippon Zeon Co. Ltd.) | 10 parts |
| Polyurethane resin T-5206 (Dainippon Ink and Chemicals Inc.) | 5 parts |
| Sorbitan monostearate SP-S10 (Kao Corporation) | 5 parts |
| MEK | 50 parts |
| Toluene | 50 parts |
| Cyclohexan one | 15 parts |

(Test Parameters and Results)

Peelabilities of the transferable substrate film, resistance to sticking to the mirrored plate of the laminating machine, concealment for the magnetic recording layer and adhesion between the concealment layer and intermediate layer were evaluated using the following test methods for the magnetic cards having a concealment layer obtained in Examples 1 to 10 and Comparative Examples 1 to 3. Those results are shown in Table 2.

Peelabilities of Transferable Substrate Film

The heat-sensitive adhesive layers of the transferable magnetic recording media obtained in Examples 1 to 10 and Comparative Examples 1 to 3 were adhered onto an overlay sheet having a thickness of 100 μm serving as a portion of a card base followed by heating from the side of the transferable substrate film for 10 seconds at 120° C. and 1 kg/cm² using a heat sealing machine to heat-seal each transferable magnetic recording medium to the overlay sheet. Subsequently, the transferable substrate film was peeled at a peeling angle of 180° and a speed of 20 m/min using a high-speed peeling tester (Tester Sangyo Co., Ltd.) to measure the peel strength at that time.

Peel strength of 0 to 300 mN was indicated with a ○, that of 300 to 1000 mN with a Δ, and that of 1000 mN or more with an X.

In general, in the case of peel strength of 0 to 300 mN, peeling remains stable at all times with an actual transfer machine, while in the case of peel strength of 300 to 1000 mN, although the surface of the intermediate layer is subjected to slight damage which has an effect on heat resistance, this degree of damage is still within the range of actual use. In the case of peel strength of 1000 mN or more, the transferable substrate film either does not peel off or causes considerable damage such as partial destruction of the surface of the intermediate layer.

Resistance to Sticking to Mirrored Plate of Laminating Machine

After transferring the transferable magnetic recording media produced in Examples 1 to 10 and Comparative Examples 1 to 3 onto the overlay sheet and peeling off the transferable substrate film, two core sheets having a thickness of 280 μm were layered onto the opposite side of the magnetic recording layer of the overlay sheet on which this magnetic recording layer was formed after which an additional overlay sheet having a thickness of 100 μm was layered thereon followed by laminating with the mirrored plate of a tabletop press machine under conditions of a temperature of 150° C., pressure of 25 kg/cm2 and time of 15 minutes. Subsequently, a card base was obtained in which the surface of the intermediate layer and surface of the card base formed a single surface by cooling to room temperature over the course of about 30 minutes while maintaining pressure. Following completion of laminating, the status of locations of the mirrored plate where the intermediate layer was in contact was observed visually after removing the mirrored plate from the card base.

The absence of adhesion to the mirrored plate was evaluated as ○, slight adhesion of the components of the intermediate layer or magnetic recording layer to the mirrored plate was evaluated as Δ, and strong resistance when the mirrored plate is peeled from the card base, strong adhesion of the components of the intermediate layer or magnetic recording layer to the mirrored plate and/or changes in the surface of the intermediate layer were evaluated as X.

Concealment for Magnetic Recording Layer

Card bases in which coating of concealment layers 1 and 2 and the protective layer had been completed in Examples 1 to 10 and Comparative Examples 1 to 3 were laminated using a tabletop press machine under conditions of a temperature of 110° C., pressure of 25 kg/cm² and time of 15 minutes. Subsequently, the smoothness of the magnetic card surface was enhanced by cooling to room temperature over the course of about 30 minutes while maintaining pressure.

Differences in the color after pressing between the section of the card at which the magnetic recording layer is concealed and surrounding sections other than this section, as well as the presence of lines in the section where the magnetic recording layer is concealed, were evaluated visually.

Based on visual examination, the absence of differences in the color between the section where the magnetic recording layer is concealed and other surrounding sections and the absence of visible lines at the boundary were evaluated as ○, the presence of a difference in the color between the section where the magnetic recording layer is concealed and other surrounding sections detectable when the angle of the card is changed, and the presence of slightly visible lines at the boundary were evaluated as Δ, and the presence of clear difference in the color between the section where the magnetic recording layer is concealed and other surrounding sections and well-defined lines at the boundary were evaluated as X.

Adhesion Between Concealment Layer and Intermediate Layer

The surface covering a range that included the magnetic recording layer concealment section of the concealment layer and its surrounding sections of the magnetic cards produced in Examples 1 to 10 and Comparative Examples 1 to 3 was cut with a cutter or similar tool into a crisscross pattern at about 1 mm intervals, adhesive tape was strongly adhered over the crisscross pattern and only the adhesive tape was rapidly peeled upward while anchoring the card to visually observe for the removal of the concealment layer.

Complete absence of removal of the concealment layer was evaluated as ○, partial removal of only the concealment layer where the cuts of the crisscross pattern were made without removal of the concealment layer inside the crisscross squares was evaluated as Δ, and removal of the concealment layer, including that inside the crisscross squares was evaluated as X.

TABLE 2

Comparison of Characteristics

| | Peelabilities of Transferable substrate film | Resistance to Sticking to Mirrored Plate of Laminating Machine | Concealment for Magnetic Recording Layer | Adhesion Between Concealment Layer and Intermediate Layer |
|---|---|---|---|---|
| Example 1 | ○ | Δ | ○ | ○ |
| Example 2 | ○ | ○ | ○ | ○ |
| Example 3 | ○ | ○ | ○ | ○ |
| Example 4 | ○ | ○ | ○ | ○ |
| Example 5 | Δ | ○ | Δ | ○ |
| Example 6 | ○ | Δ | ○ | ○ |
| Example 7 | ○ | ○ | ○ | ○ |
| Example 8 | ○ | ○ | ○ | ○ |
| Example 9 | Δ | ○ | ○ | ○ |
| Example 10 | Δ | ○ | Δ | ○ |
| Comp. Ex. 1 | ○ | ○ | X | X |
| Comp. Ex. 2 | X | — | — | — |
| Comp. Ex. 3 | ○ | X | X | ○ |

As can be understood from Tables 1 and 2, although a smaller amount of resin component results in satisfactory peelabilities of the transferable substrate film, since there is a shortage of binder component, the coated layer of the intermediate layer tends to be susceptible to the occurrence of internal destruction caused by stress, which in turn causes sticking. In addition, if the amount of non-magnetic inorganic fine particle component is low while the amount of the resin component is high, the peelabilities of the transferable substrate film tend to be poor, since the surface of the intermediate layer becomes rough during peeling causing surface to become rough, concealment for tile magnetic recording layer tends to decrease.

In addition, when a resin having a high $T_g$ (glass transition point) is used as indicated in Comparative Example 1, although peelabilities and resistance to sticking are satisfactory, requirements for concealment for the magnetic recording layer and adhesion of the concealment layer are unable to be satisfied.

Comparative Example 2, which does not have an intermediate layer, did not permit the production of a magnetic card as a result of being unable to satisfy the requirement for peelabilities. On the other hand, in the case of Comparative Example 3, in which a hardener is not added to the magnetic recording layer, although the requirement for peelabilities is satisfied, sticking occurs in the magnetic recording layer during transfer, thereby resulting inferior concealment for the magnetic recording layer.

In this manner, as a result of using an intermediate layer containing non-magnetic inorganic fine particles, even if magnetic particles having a large particle size are used in the magnetic recording layer, a magnetic card can be obtained that has superior peelabilities of the transferable substrate film and superior resistance to sticking to the mirrored plate of a laminating machine, satisfactory concealment for the magnetic recording layer, and satisfactory adhesion of the concealment layer.

Since the magnetic recording medium of the present invention has an intermediate layer that covers a magnetic recording layer between the magnetic recording layer and a concealment layer, and said intermediate layer contains non-magnetic inorganic fine particles, together with having superior heat resistance during processing, both the requirements of concealment for the magnetic recording layer and adhesion of the concealment layer can be satisfied simultaneously. Due to the presence of this intermediate layer, even in the case in which the magnetic particles used in the magnetic recording layer are large-size particles in the manner of magnetoplumbite-type ferrite magnetic particles, a magnetic recording medium can be produced without impairing the aforementioned heat resistance, concealment and adhesion.

In addition, when using the transferable magnetic recording medium of the present to form the aforementioned intermediate layer, since the intermediate layer that contacts the transferable magnetic recording medium contains non-magnetic inorganic fine particles, peelabilities in the transfer process are extremely superior.

What is claimed is:

1. A magnetic recording medium comprising:
    a non-magnetic substrate made from a thermoplastic resin,
    a magnetic recording layer,
    an intermediate layer and
    a concealment layer; wherein,
    the magnetic recording layer, the intermediate layer and the concealment layer are sequentially layered,
    the surface of the intermediate layer forms a single smooth surface with the surface of the non-magnetic substrate by embedding the magnetic recording layer and the intermediate layer within a portion of the non-magnetic substrate,
    the concealment layer conceals the surface of the non-magnetic substrate and the surface of the intermediate layer, and
    the intermediate layer contains non-magnetic inorganic fine particles.

2. A magnetic recording medium according to claim 1, wherein the non magnetic inorganic fine particles are at least one type selected from the group consisting of non-magnetic inorganic fine particles having a volume average particle diameter of 0.2 μm or less and needle-shaped non-magnetic inorganic fine particles having a long axis length of 0.5 μm or less.

3. A magnetic recording medium according to claim 1, wherein the content of non-magnetic inorganic fine particles of the intermediate layer is 20 to 80% by weight.

4. A magnetic recording medium according to claim 1, wherein the non-magnetic substrate is composed of a vinyl chloride copolymer based resin, and the intermediate layer contains a vinyl chloride copolymer based resin as binder resin.

5. A magnetic recording medium according to claim 1, wherein the magnetic recording layer contains magnetoplumbite-type ferrite magnetic particles.

* * * * *